(12) United States Patent
deCarmo

(10) Patent No.: US 8,577,983 B2
(45) Date of Patent: Nov. 5, 2013

(54) SYSTEM AND METHOD FOR NOTIFYING AN INSTANT MESSAGE RECIPIENT OF RECEIPT OF A MESSAGE

(75) Inventor: Linden deCarmo, Plantation, FL (US)

(73) Assignee: Pace PLC, Shipley (GB)

( * ) Notice: Subject to any disclaimer, the term of this patent is extended or adjusted under 35 U.S.C. 154(b) by 1887 days.

(21) Appl. No.: 10/194,342

(22) Filed: Jul. 12, 2002

(65) Prior Publication Data
US 2004/0010808 A1    Jan. 15, 2004

(51) Int. Cl.
G06F 15/16    (2006.01)
H04N 7/173    (2011.01)

(52) U.S. Cl.
USPC .............................. 709/207; 709/206; 725/110

(58) Field of Classification Search
USPC ...................... 725/58, 108, 110; 709/206, 207
See application file for complete search history.

(56) References Cited

U.S. PATENT DOCUMENTS

| | | | |
|---|---|---|---|
| 5,617,541 A | 4/1997 | Albanese et al. | |
| 5,948,054 A | 9/1999 | Nielsen | |
| 6,081,830 A * | 6/2000 | Schindler | 709/204 |
| 6,094,681 A | 7/2000 | Shaffer et al. | |
| 6,101,531 A | 8/2000 | Eggleston et al. | |
| 6,212,553 B1 | 4/2001 | Lee et al. | |
| 6,301,608 B1 | 10/2001 | Rochkind | |
| 6,301,609 B1 | 10/2001 | Aravamudan et al. | |
| 6,754,904 B1 * | 6/2004 | Cooper et al. | 725/32 |
| 2002/0104095 A1 * | 8/2002 | Nguyen et al. | 725/110 |
| 2003/0018726 A1 * | 1/2003 | Low et al. | 709/206 |
| 2003/0028882 A1 * | 2/2003 | Davis et al. | 725/44 |
| 2003/0070182 A1 * | 4/2003 | Pierre et al. | 725/135 |

OTHER PUBLICATIONS

"Gabber Manual", 2001, http://prdownloads.sourceforge.net/gabber/gabber.pdf.

* cited by examiner

*Primary Examiner* — Nasser Goodarzi
*Assistant Examiner* — Hyun Hong

(57) ABSTRACT

A system and method for notifying an instant message recipient of the arrival of the instant message is provided, and includes managing the presence of the recipient on a network, determining a notification priority level of the message, and notifying the recipient based on the notification priority level. In embodiments, the higher the notification priority level, the more sensorially obtrusive the notification can be.

43 Claims, 5 Drawing Sheets

SYSTEM AND METHOD FOR NOTIFYING AN INSTANT MESSAGE RECIPIENT OF RECEIPT OF A MESSAGE

BACKGROUND OF THE INVENTION

This invention relates to a system and method for providing instant messaging services in an interactive multimedia environment.

Instant messaging (IM) allows two or more network users to exchange messages with other in real (or near-real) time. IM differs from ordinary e-mail in that the messages are exchanged immediately, requiring all users to be online at the same time. Accompanying some versions of instant messaging is a "buddy list" (also called "presence management"), which lists a user's friends or co-workers who have access to the network. When a "buddy" on the user's buddy list logs on to (or off of) the network, the user is notified. Similarly, when the user logs on to or off of the network, buddies who are online and whose lists include the user are notified. This enables the user and the buddy or buddies to exchange instant messages with each other. Conventional networks include proprietary computer networks such that of America Online® (AOL), semi-private networks such as that of Microsoft® (MSN Messenger), and public networks such as the Internet. Instant messaging is also available via set-top boxes (STBs) connected to a user's television. Examples of these systems are AOLTV®, WebTV®, and Microsoft® TV Messenger.

As part of these conventional systems, users have some control over which messages they receive from others. For example, users can block all messages sent to their set-top box or computer terminal, and may be able to block messages from specific people. In one system, disclosed in U.S. Pat. No. 6,301,609, a user who has access to data or communication devices such as a personal computer, wireline or wireless telephone, or personal digital assistant may define rules, assigning priorities to respective buddies in the buddy list. As disclosed in that reference, a buddy assigned a high priority is able to discern the user's online status, just as other systems permit. In addition, a buddy assigned a low priority is not able to discern whether the user is online or offline, and communicates with the user via a user proxy, while a buddy assigned the highest priority is permitted to interface directly with the user while the user is online, and interface with the proxy while the user is offline.

SUMMARY OF THE INVENTION

While these instant messaging systems are somewhat able to filter out unwanted messages, when a user is watching TV or enjoying some other interactive video or multimedia experience, that user may not want his or her presence to be known to others or to be interrupted by instant messages. At the very least, such a user may want to control the visual obtrusiveness of the instant messages on the viewing experience.

What is needed is a system that manages a user's presence and allows the user to participate in instant messaging without unnecessarily distracting the user from the interactive video/multimedia experience. The present invention includes automated presence management, a message notification priority scheme based on viewing preferences, and message notification based on the results of the scheme. Presence management, i.e., the ability to detect others connected to the network and to inform others connected to the network of the user's presence, may be automated based on which channel the user is tuned to or which video stream (e.g., program) the user is watching. The user registers preferred channels and/or programs during the viewing of which the user does not want to be interrupted. When the user is tuned to such a channel or is watching such a program, the invention takes the user offline so that the user is not "present" on the instant messaging network. ("Taking a user offline" includes deregistering the user if the user is online or not registering the user if the user is already offline.) When the user changes the channel or a different program comes on, the invention again determines, based on the user's preferences, whether the user wants his or her presence to be known while tuned to the new channel or watching the new program. If the user wants his or her presence to be known, the invention puts the user online, which includes registering the user if the user is offline or not deregistering the user if the recipient is already online.

The message notification priority scheme determines the notification level, e.g., low, medium, high, and urgent, of an instant message based on a comparison of the user's notification preferences and the channel, program, and/or type of program being watched, the identity of the sender, and the urgency of the message. The notification level controls the manner (e.g., the visual obtrusiveness) in which the user is notified of the message. A message having a lower notification level may be indicated to the user by illuminating an unobtrusive light on the set-top box, whereas a message having a higher notification level may be indicated by flashing the message across the TV screen, potentially obstructing or obscuring the viewing of the program.

One advantage of the invention over the prior art is that the user's presence is automatically managed based on more than just the identity of the sender (as in U.S. Pat. No. 6,301,609). The present invention takes into account that the user's primary interest in turning on the television is to watch TV, not necessarily to engage in instant messaging. The invention therefore records a user's viewing preferences based on channel and/or program (including programs played on a video cassette player and DVD player), and automatically manages the user's presence based on those preferences, not on the message sender's identity.

Another advantage is that when, based on the user's preferences, the invention allows the user's presence to be acknowledged by the user's buddies, the invention discriminates among messages sent to the user by determining the notification level appropriate for each message based on the program and channel currently being viewed, the urgency of the message, and the identity of the sender. An exemplary embodiment of this invention is therefore much more related to television viewing than is the prior art, and also has many more permutations of discriminating among messages to determine how to notify the user that such a message has been received and how such a message should be viewed.

However, the invention is not limited to television viewing. The invention in its broader sense includes automated presence management on any instant messaging network, determining the notification level of a received instant message, and notifying the recipient based on the notification level. The notification may affect any sense of the recipient, not just the recipient's vision. In addition, the higher the notification level, the more sensorially obtrusive the notification.

Viewed in this broader sense, the invention is relevant to a number of activities in which a recipient may engage so long as the recipient is connected to a network while engaging in the activity, and has access to an instant messaging platform to respond to a received message. An example of such activity is listening to music over a network, and the message notification would be indicated aurally. Another visual activity may be playing video games over a network, without using a set-top box. Most interactive multimedia activities are candidates for this invention.

Additional advantages of the invention will be set forth in the description which follows, and in part will be apparent from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

The present invention in its exemplary form automatically manages a user's (or a message recipient's) presence on an instant messaging network based on the video stream being viewed by the user. The term "video stream" can include the channel, the video program, and the type of video program being viewed. If the user's presence is divulged, the invention then automatically determines the notification level of received instant messages based on the user's preferences of video stream, sender's identity, and message urgency. Finally, based on the determined notification level, the invention notifies the user that such a message has been received.

In one embodiment of the present invention, a prioritization scheme may include the following notification levels: ignore, low, medium, high, and urgent, although the invention supports more or fewer levels of notification. Messages to be ignored may be junk instant messages (akin to "junk mail") or spam or messages from unidentified or unfamiliar senders, and these messages may be rejected out of hand.

Figure 1:
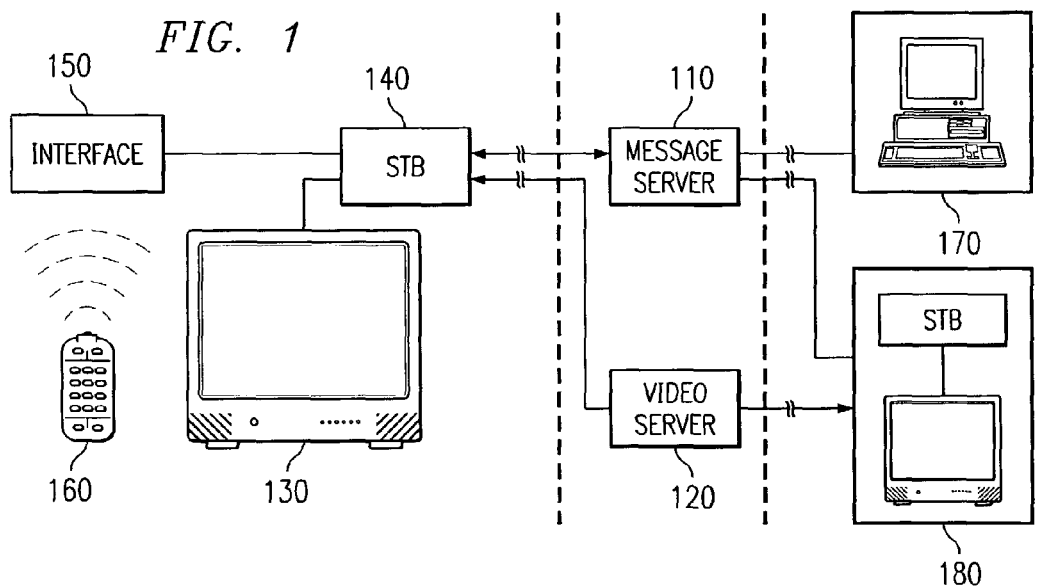
FIG. 1 is a block diagram illustrating a system for prioritizing instant messages in accordance with an embodiment of the present invention.

FIG. 1 is a block diagram that illustrates an embodiment of the system of the present invention. Included in such a system 100 are instant message server 110, video server 120, television (TV) 130, set-top box (STB) 140, interface 150, remote control 160, and buddies 170, 180. Instant message server 110 and video server 120 are typically computers comprising a central processing unit (CPU), memory, and input/output (I/O) means.

Instant message server 110 is connected to message receiving apparatuses, such as a user's STB 140, a buddy's STB 180, and a buddy's computer 170. Such connection can be direct (e.g., hardwired), but more typically is made via a network. Such a network may be the public switched telephone network (PSTN), and the message receiving apparatuses may be connected to the PSTN via modems or T1 lines. Other networks include local area networks (LANs), wide area networks (WANs), metropolitan area networks (MANs), Intranets, and general-purpose networks, such as the Internet, and other networks running Internet protocol (IP).

Video server 120 is connected to user's STB 140 to deliver a wide range of video programming such as movies, video games, television shows, sports, and other programming as is typically offered or will be offered by cable television and satellite television providers. Video server 120 may also be connected to buddy's STB 180, but it is not a requirement of the invention. Video server 120 is not a requirement of the instant messaging portion of system 100, but video programming broadcast on TV 130 is.

Buddies 170, 180 are examples of a wide range of people who may be connected to message server 110 using a personal computer (170), an STB (180), or some other communication device. There may be hundreds, thousands, or even millions of people with the capability to connect to message server 110, and many of those may be simultaneously connected to message server 110. A subset of those with such capability may be on any single user's buddy list.

STB 140 can be a set-top box as known generally in the art, capable of receiving video programming from video server 120 and decoding (if needed) and transmitting such programming to TV 130. As part of the present invention, STB 140 is also capable of communicating with message server 110, and transmitting such communications to TV 130, so that the messages may be viewed on TV 130. STB 140 may also include lights (such as LEDs) indicating messages waiting for the user, analogous to e-mail notification indicators prevalent in the e-mail art. TV 130 may include any type of television monitor that can broadcast video programming. This includes conventional cathode-ray tubes (CRTs), LCD monitors, plasma monitors, HDTV monitors, and other monitors. Although pictured as separate from TV 130, STB 140 may be integrated into TV 130, so long as TV 130 includes the proper means for connecting to message server 110 and video server 120.

Interface 150 is used to set up the user's preferences with respect to preferred channels and programs and also to create and maintain buddy lists and priorities associated with each buddy. Generally, such interface will be displayed on TV 130, but it is within the present invention for interface 150 to include a display separate from that of TV 130. Although pictured as a separate block in FIG. 1, interface 150 is preferably integrated with STB 140. If STB 140 is integrated with TV 130, interface 150 may still be integrated with STB 140, allowing STB 140, interface 150, and TV 130 to be a single physical unit. Remote control 160 can be any conventional remote control, but is programmed to interact with interface 150 and STB 140. It is also possible for a user to interact with interface 150, STB 140, and TV 130 without using remote control 160, but such interaction may be limited. In addition to or instead of remote control 160, there may be a keyboard with a mouse for inputting a user's preferences into interface 150 or STB 140. Other means for inputting preferences and for interacting with interface 150 are within the present invention.

Figure 2A:
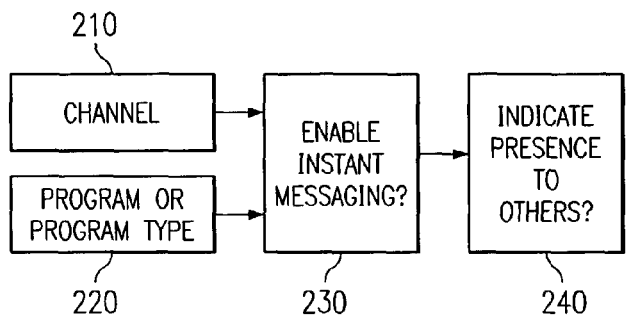
FIG. 2A is a block diagram illustrating a system for automating presence management in accordance with an embodiment of the present invention.
Figure 2B:
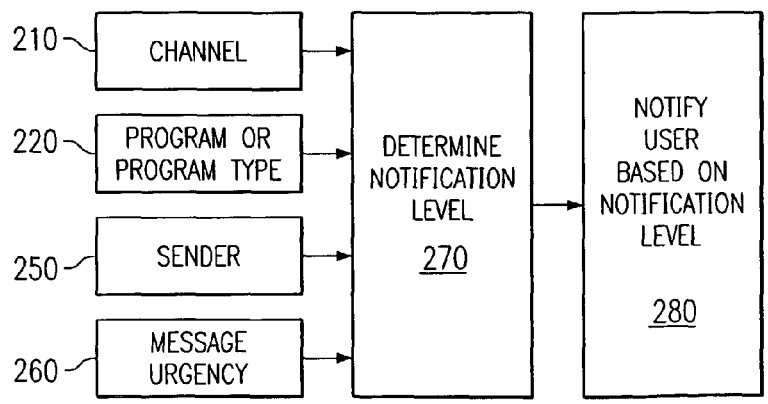
FIG. 2B is a block diagram illustrating a system for determining the notification level of an instant message and notifying a user of the instant message based on the notification level, in accordance with an embodiment of the present invention.

The invention includes aspects of automatically managing a user's presence and determining the notification level of an instant message destined for a user. FIG. 2A illustrates blocks of a system for automating presence management in accordance with an embodiment of the present invention, and FIG. 2B illustrates blocks of a system for determining the notification level of a received instant message and notifying a user of the instant message in accordance with an embodiment of the present invention. FIG. 2A indicates that channel 210 and program or program type 220 are inputs to block 230 that determines whether a user desires instant messaging to be enabled, based on the user's indicated preferences. If such instant messaging is desired, block 240 indicates to others connected to message server 110 of the user's presence. If such instant messaging is not desired, block 240 takes the user's presence offline, so that the user's buddies will not think that such user is online and available for instant messaging.

FIG. 2B indicates that the identity of sender 250 and message urgency 260, as well as channel 210 and program or program type 220 as in FIG. 2A, are inputs to block 270 that determines the notification level of a message, based in part on the user's indicated preferences. Once the notification level is determined, block 280 notifies the user of that message based on the notification level.

Figure 3:
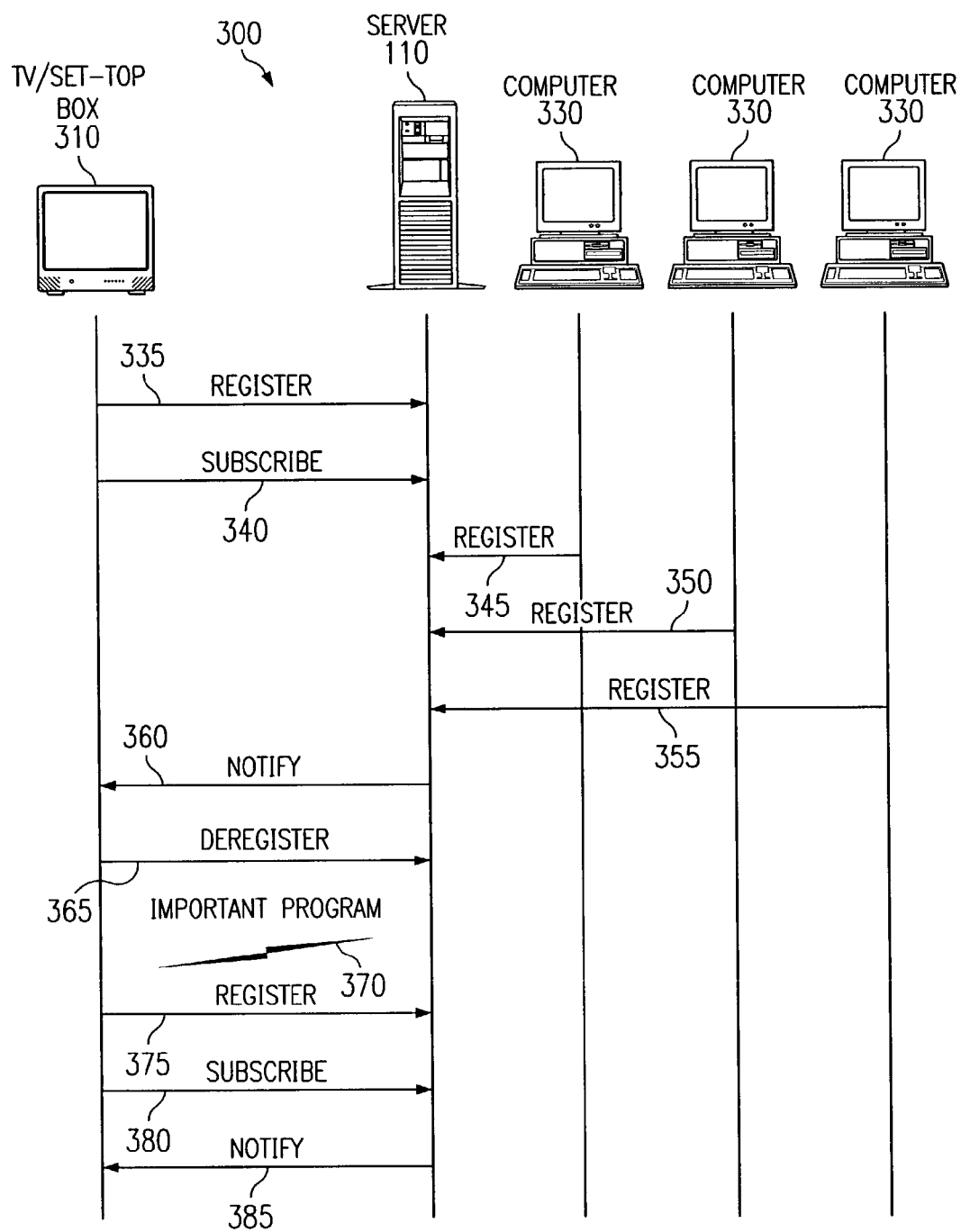
FIG. 3 is a schematic diagram illustrating a system for automating presence management in accordance with an embodiment of the present invention.

FIG. 3 illustrates some of the steps involved in automatically managing the user's presence. FIG. 3 shows TV/STB 310, message server 110, and buddy computers 330. The terms used in FIG. 3 are syntax from a session-based multimedia protocol, Session-Initiation Protocol (SIP), which generally runs on top of IP (Internet Protocol). SIP is one example of a protocol that can be used with an instant messaging system. Other communication protocols known in the art may be used instead. "Registration" tells the proxy that a user is online and occurs when the STB is turned on, when the user comes online after being offline, and when the user re-registers using "keep-alive" messages sent to the proxy at set intervals (e.g., every few minutes, but the actual interval is set by the network administrator). If the proxy does not receive several consecutive "keep-alive" messages, the registration expires, and the user is considered to be offline. "Subscription" tells the proxy under what conditions the user should be notified of instant messages and occurs when the STB is turned on, when the user comes online after being offline, and when the user changes his or her notification preferences. "Notification" lets the user know when a buddy has come online.

When the user turns on the set-top box, the STB registers the user in step 335, and, in step 340, the STB subscribes the user. When buddies 330 come online, they are also registered in steps 345, 350, 355, and the proxy notifies the user in step 360 of the buddies' presence. If a video program 370 comes on (because, for example, the user changes the channel or a different program starts on the same channel) during which the user does not want to be interrupted with instant messages, STB 140 deregisters the user in step 365, effectively taking the user offline. Once that video program ends, the system checks to see if the next program is one during which the user does not want to be interrupted. If not, the STB re-registers the user in step 375, re-subscribes the user in step 380, and notifies in step 385 the user's buddies who are online at that time.

Figure 4:
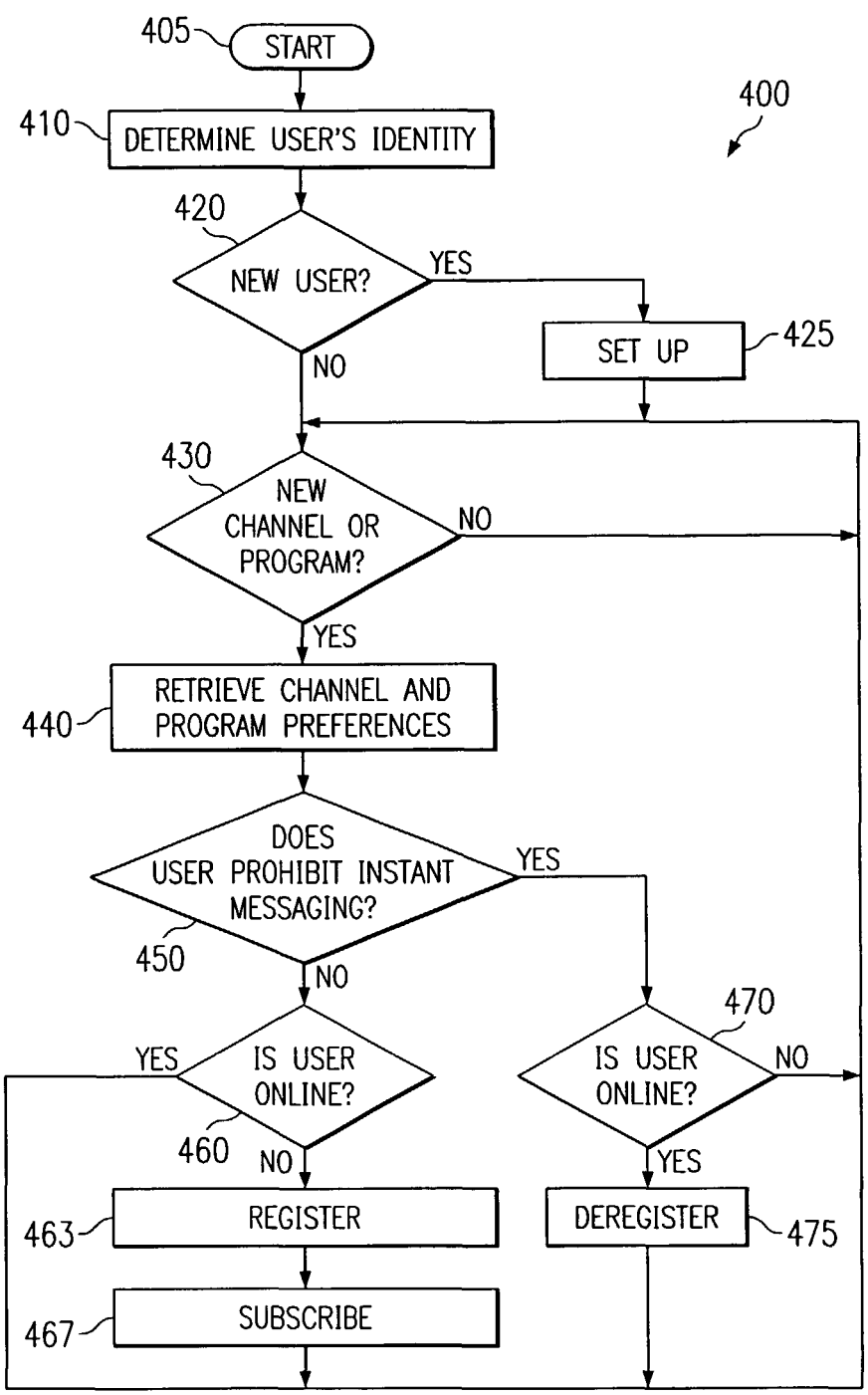
FIG. 4 is a flowchart of a method for automating presence management in accordance with an embodiment of the present invention.

FIG. 4 describes this process using flowchart 400. A user turns on STB 140 in step 405 to start the flowchart. In step 410, the system determines the user's identity. If only a single user has been set up to use the system, this step assumes that the user's identity is the already-identified user and proceeds to step 430. If the system is used by a family, for example, the user chooses his or her identity from a list. The system may also require passwords for security. If the user is a new user (step 420), the system prompts to set up that new user in step 425. Such set-up may include using interface 150 and remote control 160 to specify the user's preferences with respect to favorite and preferred channels and programs and also to create and maintain buddy lists and notification levels associated with each buddy, as well as how to handle senders who are not on the buddy list. Channel and program preferences include specifying for which channels and specific programs or program types (e.g., sports, soap operas, etc.) the user does not want to appear available for instant messaging. In addition, the system may offer a default profile that may be customized by the user on a program-by-program or channel-by-channel basis. For example, there may be buttons on remote control 160 to add the current channel or program or program type to or delete it from the user's profile. There may also be a button to delete a buddy from the user's buddy list and a button to add a buddy to the user's buddy list, which, once pressed, would prompt for the priorities associated with that added buddy.

Once the user is set up and identified, step 430 asks whether a new channel or program is being selected, or a different program is coming on. If the user is turning on the STB, the answer is yes. If so, in step 440, the system retrieves the user's channel and program preferences. Once those preferences are retrieved, step 450 asks whether the user prohibits instant messaging during the currently-tuned channel and/or program. If so; step 470 asks whether the user is currently online. If not, the process loops back to step 430 to wait for a new channel or program input (or a different program). If the user is currently online, step 475 deregisters the user as in step 365, effectively taking the user offline. The process then loops back to step 430 to wait for a new channel or program input. If in step 450 the user does not prohibit instant messaging during the currently-tuned channel and/or program, step 460 asks whether the user is currently online. If so, the process loops back to step 430 to wait for a new channel or program input. If the user is currently offline, step 463 registers the user as in step 335 or 375, and step 467 subscribes the user as in steps 340 or 380. The process then loops back to step 430 to wait for a new channel or program input.

Figure 7:
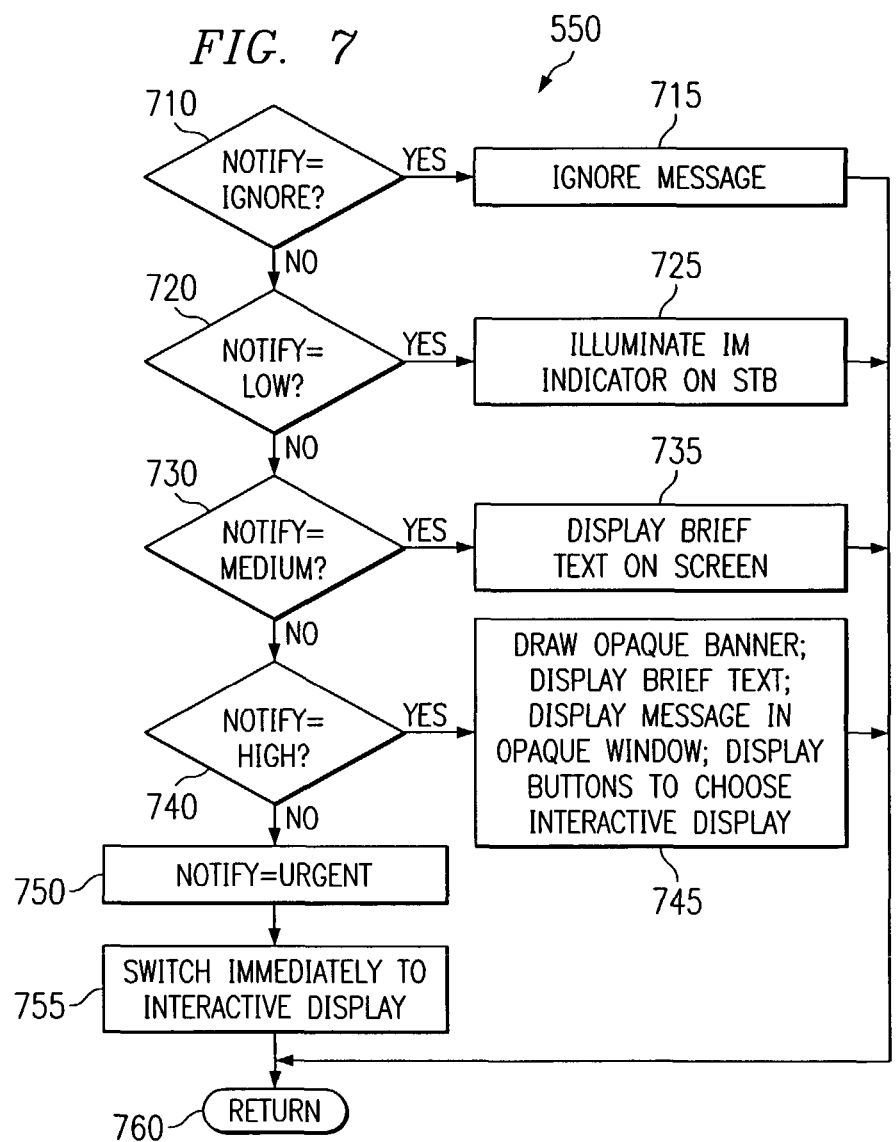
FIG. 7 is a flowchart of a subroutine of the flowchart in FIG. 5 for notifying a user of an instant message based on the notification level.

Flowchart 400 is based on the user and the user's preferences and interacts with message server 110 to automatically establish or hide a user's presence and availability for instant messaging. In contrast, the flowcharts in FIGS. 5-7 are based on determining whether the user should be notified of a message received by STB 140 and, if so, how the user should be notified.

Figures 5, 6:
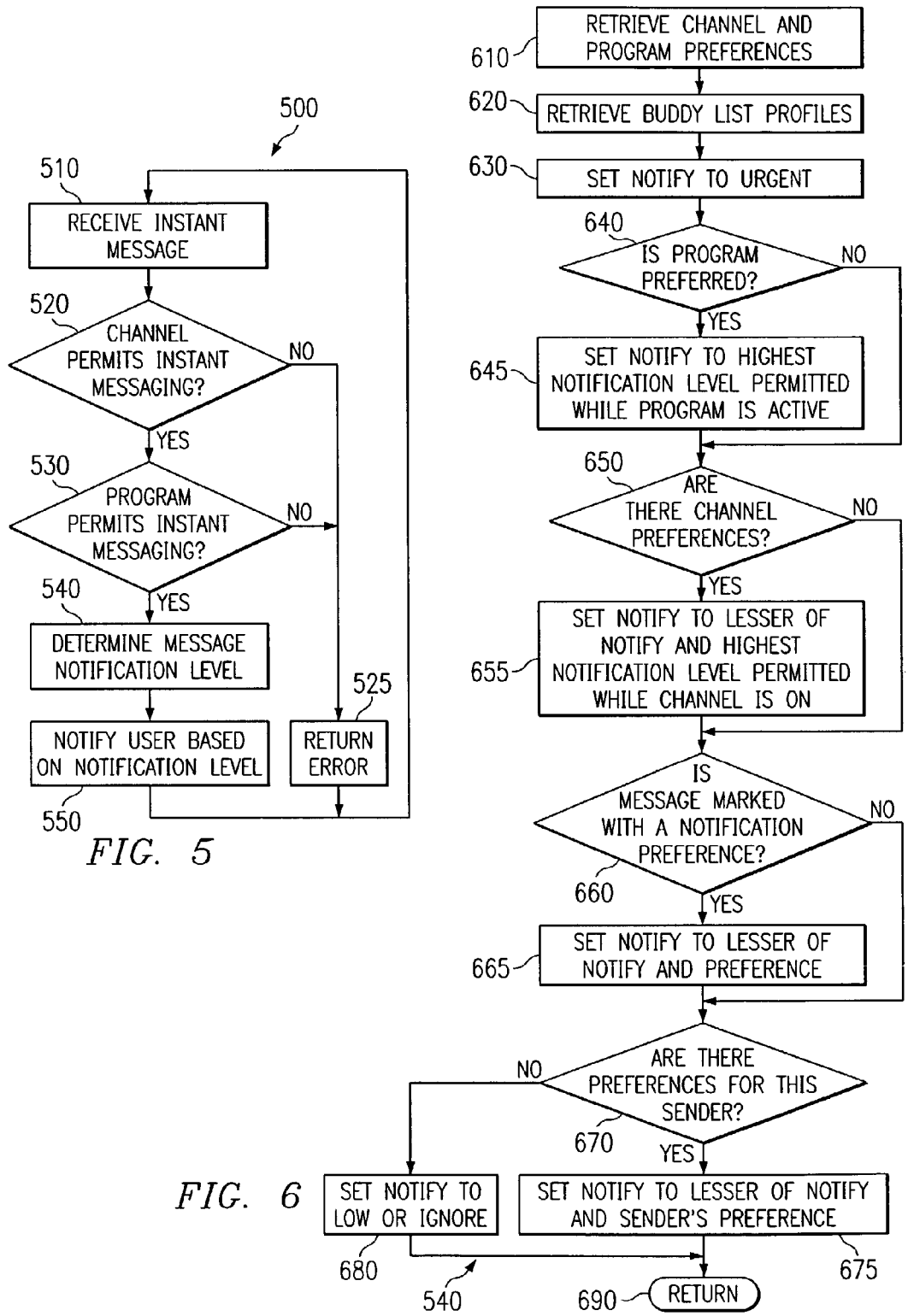
FIG. 5 is a flowchart of an overall method for determining the notification level of an instant message and notifying a user of the instant message based on the notification level, in accordance with an embodiment of the present invention.
FIG. 6 is a flowchart of a subroutine of the flowchart in FIG. 5 for determining the notification level of an instant message.

FIG. 5 is a flowchart of one embodiment of an overall method for determining the notification level of an instant message and notifying a user of the instant message based on the notification level. An instant message is received in step 510. This message may be received from message server 110 because the user has indicated the preference to be available for instant messaging according to the flowchart in FIG. 4. However, it may be possible for a message to reach STB 140 without being routed through message server 110, generally as a result of spammers or other unauthorized users being able to bypass the presence management safeguards. This may happen because STB 140 will generally have its own IP (Internet Protocol) address, which, although not publicly disclosed, may be accessed randomly or discerned by others with the appropriate detection equipment.

In such a case, it is again necessary to determine if the user has indicated availability for receiving instant messages. Step 520 asks whether the user permits instant messaging when tuned to the current channel. If not, step 525 may return an error to the proxy so that the proxy can report that the user is offline, or may, in the case of a spammer or an unknown party, return no response so that the sender does not attempt to access the user's IP address again.

If instant messaging is permitted in step 520, step 530 asks whether the user permits instant messaging when tuned to the current program or program type. If not, the flowchart proceeds to step 525 as before. If instant messaging is permitted in step 530, the system determines the message notification level in step 540, as discussed with respect to the flowchart in FIG. 6, and then notifies the user in step 550 of the message based on the determined notification level, as discussed with respect to the flowchart in FIG. 7.

FIG. 6 is a flowchart of subroutine 540 for determining the notification level of an instant message. The levels used in this example are ignore, low, medium, high, and urgent. Other embodiments of the invention could use more or fewer levels. Step 610 retrieves the user's channel and program preferences, and step 620 retrieves the user's buddy list profiles. In step 630, the variable Notify is set to the highest notification level, in this example "urgent."

Step 640 asks whether the current program or program type is "preferred." Already discussed are most favored programs or program types for which the user has indicated he or she is unavailable for instant messaging while the program is being shown. Here, a "preferred" program or program type is generally one during which the user is available for instant messaging, but the user has restricted the way in which he or she is notified of such a message. If the program or program type is "preferred," step 645 sets Notify to the highest notification level permitted while the program is active. For example, if the user wants to further restrict notification, Notify will be set lower, e.g., to "low," whereas if the user wants to allow more notification, Notify will be set higher, e.g., to "high." It is also possible for the user to have gradations of preferred programs, such as categories of "more preferred," "preferred," and "less preferred" programs. In such cases, the notification level of messages received during a more preferred show would likely be set to "low" or "medium," that of messages received during a preferred show would likely be set to "medium" or "high," and that of messages received during a less preferred show would likely be set to "high." If the program has not been designated as preferred, step 640 returns "no" and Notify remains the same (i.e., "urgent").

Next, step 650 asks whether there are any preferences associated with the current channel. Already discussed are channels for which the user has indicated he or she is unavailable for instant messaging. Here, a user may have indicated a preference for restricting the way in which he or she is notified of an instant message while watching such a channel. If such preferences or attributes exist, step 655 determines the highest notification level permitted while the channel is on, and sets Notify to the lesser of the current Notify and such notification level. For example, if Notify is set to "urgent," but the highest notification level permitted while the channel is on is "low," Notify will be set to "low." If, however, Notify is set to "medium" and the highest notification level permitted while the channel is on is "high," Notify will remain at "medium." As with "favorite" programs or program types, different channels may have different maximum notification levels associated with them. If the current channel has no preferences associated with it, step 650 returns "no" and Notify remains the same.

Next, step 660 asks whether the message itself is marked with an "urgency" or an "importance" notification preference. Such preferences are set by the sender and may include "urgent," "high," "medium" or "normal," or "low," although most messages would either be marked "urgent" or "high" or have no preference. If such a notification preference exists, step 665 sets the notification level to the lesser of the current Notify and such notification preference. If the received message has no preferences associated with it, step 660 returns "no" and Notify remains the same.

Next, step 670 asks whether the user has set any notification preferences associated with the sender (e.g., buddy) of the message. Preferences may be set up for senders who are buddies, i.e., known to the user and liked by the user, and also for senders who are known to the user and disliked, e.g., spammers, junk messengers, etc. Those who are buddies may have notification preferences of "urgent," "high," "medium," or "low." Those who are disliked will most likely have notification preferences of "ignore." If such a preference exists, step 675 sets the notification level to the lesser of the current Notify and such notification preference. If the sender has no associated preferences, the sender is likely unknown to the user, and step 680 sets Notify to "ignore" or "low" based on buddy list user preferences. Once the final notification level is determined in steps 675 or 680, the value of Notify is returned in step 690 to flowchart 500.

FIG. 7 is a flowchart of subroutine 550 for notifying a user of an instant message based on the notification level determined in subroutine 540. As before, Notify can have the value ignore, low, medium, high, or urgent. Step 710 asks if Notify is "ignore." If so, step 715 ignores the message and returns in step 760 to flowchart 500. If not, step 720 asks if Notify is "low." In general, the message indication for a "low" notification level should be relatively unobtrusive to the user. Thus, if Notify is "low," step 725, for example, illuminates the IM indicator on STB 140, and then returns in step 760 to flowchart 500.

If Notify is not "low," step 730 asks whether Notify is "medium." In general, the indication for a message with a "medium" notification level should be more visible than for one having a "low" notification level. Thus, if Notify is "medium," step 735, for example, may display brief text, such as the sender's e-mail address and the subject of the message, on the TV screen and then returns in step 760 to flowchart 500. If Notify is not "medium," step 740 asks whether Notify is "high." In general, the indication for a message with a "high" notification level should be more visible than for one having a "medium" notification level. Thus, if Notify is "high," step 745, for example, may draw an opaque banner on the TV screen (thus obscuring some of the video program), and within the banner may display brief text as before. Step 745 may also display the message itself or part of the message in an opaque window, and may also display buttons so that the user can choose an interactive display to interact with the sender by responding with an instant message. Once a message having a "high" notification level is indicated, the process returns in step 760 to flowchart 500.

Finally, if Notify is not "high" in step 740, Notify is deemed to be "urgent" in step 750. In general, the indication for a message with an "urgent" notification level should be more visible than for one having a "high" notification level.

Thus, if Notify is "urgent," step 755, for example, may switch immediately to an interactive instant messaging display, displaying the full text of the message, and allowing the user to respond immediately to the message. Once a message having an "urgent" notification level is indicated, the process returns in step 760 to flowchart 500.

As indicated above, the embodiments described herein use five notification levels—other embodiments of the invention may include more or fewer notification levels.

Although generally illustrated in the context of a set-top box-based system, the invention is not limited to that environment. More broadly, the invention can operate on any instant messaging network, so long as that network is coupled with an interactive activity that can notify the user of a received instant message. Again, the notification may affect any sense of the recipient, not just the recipient's vision. In addition, the higher the notification level, the more sensorially obtrusive the notification.

Additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

I claim:

1. A method for notifying an instant message recipient that the message has been received from a sender, the method comprising:
    providing a message server in communication with an apparatus designed to display a video program and provide an interface through which preferences by a recipient can be defined as to whether presence of the recipient is divulged to others on an instant messaging network associated with a particular video program while the recipient is watching the particular program;
    based on a first set of preferences defined by the recipient, allowing the apparatus to determine, upon initiation of the video program, whether the presence of the recipient on the instant messaging network should be made known to other users on the instant messaging network;
    if the presence of the recipient is to be made known to the other users on the instant messaging network, permitting the apparatus to inform the other users connected to the instant messaging network of the viewing activity of the recipient, and determine, based upon a second set of preferences defined by the recipient, a notification level for messages received by the recipient while the recipient is watching the particular program; and
    authorizing the apparatus to notify the recipient based on the notification level.

2. The method according to claim 1, wherein determining the notification level includes resolving the notification level based on the sender's identity.

3. The method according to claim 1, wherein determining the notification level includes resolving the notification level based on the urgency of the message.

4. The method according to claim 1, further comprising not delivering the message if it is determined that the presence of the message recipient is not to be made known.

5. The method according to claim 1, wherein notifying the recipient comprises sensorially indicating to the recipient receipt of the message.

6. The method according to claim 1, wherein, in the step of providing, the apparatus receives data including a video stream comprising a channel, a type of video program, and the video program.

7. The method according to claim 5, wherein the higher the notification level of the message, the more sensorially obtrusive the notification.

8. The method according to claim 6, wherein determining the notification level includes resolving the notification level based on the channel on which the video program is being broadcast.

9. The method according to claim 6, wherein determining the notification level includes resolving the notification level based on the video program being broadcast.

10. The method according to claim 6, wherein determining the notification level includes resolving the notification level based on the type of video program being broadcast.

11. The method according to claim 6, wherein determining the notification level includes resolving the notification level based on an identity of the sender.

12. The method according to claim 6, wherein determining the notification level includes resolving the notification level based on the urgency of the message.

13. The method according to claim 6, wherein determining the notification level includes making a determination, based on the second set of preferences, as to whether the recipient permits receipt of instant messages while viewing the channel.

14. The method according to claim 6, wherein the step of determining the notification level includes making a determination as to whether the recipient permits receipt of instant messages while viewing the video program.

15. The method according to claim 6, wherein the step of determining the notification level includes making a determination as to whether the recipient permits receipt of instant messages while viewing the type of video program.

16. The method according to claim 6, wherein notifying the recipient comprises visually indicating to the recipient receipt of the message.

17. The method according to claim 16, wherein the higher the notification level of the message, the more visually obtrusive the notification.

18. A method for managing a presence of a message recipient on an instant messaging network, the method comprising:
    providing an apparatus in communication with a message server, the apparatus having an interface through which a set of preferred videos streams by a recipient can be defined as to whether a presence of the recipient is divulged to other users on an instant messaging network while at least one of the video streams is displayed;
    receiving, by the apparatus, a first set of preferences defining the preferred video streams during the viewing of which the recipient does not permit receipt of instant messages, and a second set of preferences defining notification levels for messages on the instant messaging network;
    determining, by the apparatus, upon initiation of a video program, whether the video stream being viewed is one of the preferred video streams; and
    permitting the apparatus, if upon initiation of the video program it is determined that the video stream being viewed is not one of the preferred video streams, to make the presence of the recipient known or not to the other users, and subsequently change, without additional input from the recipient, a presence status of the recipient on the instant messaging network based on whether the video stream being viewed is one of the preferred video streams and based on the second set of preferences.

19. The method according to claim 18, further comprising changing the presence status to an online status if the second set of preferences permits receipt of instant messages while the recipient is viewing the current video stream.

20. The method according to claim 18, further comprising changing the presence status to an offline status if the second set of preferences does not permit receipt of instant messages while the recipient is viewing the current video stream.

21. The method according to claim 18, wherein the video stream comprises a video channel.

22. The method according to claim 18, wherein the video stream comprises a video program.

23. The method according to claim 18, wherein the video stream comprises a type of video program.

24. The method according to claim 19, wherein changing the presence status includes registering the recipient on the instant messaging network if the recipient was previously offline.

25. The method according to claim 19, wherein changing the presence status includes registering the recipient on the instant messaging network if the recipient was previously offline.

26. A method for determining a notification level for an instant message sent by a sender to a recipient during the viewing of a video stream, the video stream comprising a channel, a video program, and a type of video program, the method comprising:
providing an apparatus having an interface through which a first set of preferences can be defined as to whether the presence of a recipient is disclosed to other users on an instant messaging network while the recipient is viewing a particular video stream, and through which interface a second set of preferences can also be defined for setting notification preferences for messages received by the recipient on the instant messaging network;
allowing the apparatus in communication with a message server to determine, upon initiation of the video stream and based on the first set of preferences and the initiated video stream, whether to disclose the presence of the recipient to other users on the instant messaging network, and subsequently whether change a presence status of the recipient on the instant messaging network without additional input from the recipient; and
authorizing the apparatus, if the presence is to be disclosed, upon receipt of a message from one of the other users, to compare the notification preference for received messages in the second set of preferences to a notification level of the received message.

27. The method according to claim 26, further comprising displaying the received message based on the comparison.

28. The method according to claim 26, further comprising setting the notification level of the received message based on the comparison.

29. The method according to claim 26, further comprising setting the notification level based on a comparison of the notification preferences to preferences pertaining to the channel.

30. The method according to claim 26, further comprising setting the notification level based on a comparison of the notification preferences to preferences pertaining to the message.

31. The method according to claim 26, further comprising setting the notification level based on a comparison of the notification preferences to preferences pertaining to the sender of the message.

32. The method according to claim 26, further comprising setting the notification level based on whether any of the notification preferences pertain to the sender of the message.

33. A method according to claim 26, further comprising sensorially indicating to the recipient receipt of the message, wherein the higher a notification level of the message, the more sensorially obtrusive the notification.

34. The method according to claim 33, further comprising not notifying the recipient if the notification level indicates the message is to be ignored.

35. The method according to claim 33, wherein the recipient is viewing a video program.

36. The method according to claim 35, further comprising notifying the recipient by illuminating an unobtrusive indicator if the notification level is low.

37. The method according to claim 35, further comprising notifying the recipient by displaying identifying information about the message if the notification level is medium.

38. The method according to claim 35, further comprising notifying the recipient by partially obstructing the video program display if the notification level is high.

39. The method according to claim 35, further comprising notifying the recipient by fully obstructing the video program display if the notification level is at least very high.

40. A system for notifying an instant message recipient that a message has been received from a sender on a network while the recipient is viewing a particular video stream on a television, the system comprising:
a message server for receiving the instant message from the sender; and
a set-top box in communication with the television for:
receiving the message from the message server and presenting the video stream to the recipient;
determining, based on a first set of notification preferences of the recipient and the video stream being viewed, upon initiation of the video stream, whether to disclose a presence of the recipient on an instant messaging network to other users on the network, and subsequently whether to change presence status of the recipient on the instant messaging network without additional input from the recipient;
if the presence of the recipient is to be disclosed, informing the other users of the viewing activity of the recipient on the particular data stream, and determining a notification level for the message received from the sender; and
making a determination as to whether to notify the recipient of the message based on a second set of notification preferences of the recipient and the particular data stream being viewed.

41. The system according to claim 40, wherein the step of making includes concluding whether the recipient permits receipt of instant messages while viewing the particular video stream.

42. The system according to claim 40, wherein determining the notification level for the message includes comparing the second set of notification preferences to the video stream and the message sender.

43. The system according to claim 40, wherein the step of making includes visually indicating to the recipient receipt of the message, wherein the higher the notification level of the message, the more visually obtrusive the notification.

* * * * *